(12) United States Patent
Nishimura (10) Patent No.: US 11,265,439 B2
(45) Date of Patent: Mar. 1, 2022

(54) IMAGE FORMING APPARATUS

(71) Applicant: KYOCERA Document Solutions Inc., Osaka (JP)

(72) Inventor: Jun Nishimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/034,389

(22) Filed: Sep. 28, 2020

(65) Prior Publication Data

US 2021/0099609 A1 Apr. 1, 2021

(51) Int. Cl.
*G06F 15/00* (2006.01)
*H04N 1/34* (2006.01)
*H04N 1/00* (2006.01)

(52) U.S. Cl.
CPC ......... *H04N 1/346* (2013.01); *H04N 1/00395* (2013.01); *H04N 1/00424* (2013.01); *H04N 1/00477* (2013.01)

(58) Field of Classification Search
CPC ............... H04N 1/346; H04N 1/00395; H04N 1/00424; H04N 1/00477
USPC ......................................................... 358/1.15
See application file for complete search history.

(56) References Cited

U.S. PATENT DOCUMENTS

| 8,120,800 B2 * | 2/2012 | Kim ...................... G06F 3/1285 358/1.15 |
| 2003/0061281 A1 * | 3/2003 | Miyazaki ............... G06Q 30/06 709/203 |

FOREIGN PATENT DOCUMENTS

JP 2014-178899 A 9/2014

* cited by examiner

*Primary Examiner* — Mark R Milia
(74) *Attorney, Agent, or Firm* — Studebaker & Brackett PC (57) ABSTRACT

An image forming apparatus is used in a post-payment system based on a customer's electronic money, and includes an image forming section, a communication section, and a controller. The image forming section performs a printing operation of forming an image on a sheet. The communication section performs communication so as to acquire settlement information including information that identifies the customer. The controller controls the image forming section and the communication section. As to the printing operation performed after acquisition of the settlement information, the controller settles a printing fee with a discount in a unit price per sheet in a situation where a printed sheet count is a predetermined number or more.

10 Claims, 7 Drawing Sheets

IMAGE FORMING APPARATUS

INCORPORATION BY REFERENCE

The present application claims priority under 35 U.S.C. § 119 to Japanese Patent Application No. 2019-178684, filed on Sep. 30, 2019. The contents of this application are incorporated herein by reference in their entirety.

BACKGROUND

The present disclosure relates to an image forming apparatus.

An image forming apparatus may be installed in an environment used by an indeterminate number of people, such as a convenience store. An image forming apparatus enables a customer to select either a pre-payment system or a post-payment system for settlement of a printing fee.

SUMMARY

An image forming apparatus according to an aspect of the present disclosure is an image forming apparatus used in a post-payment system based on a customer's electronic money, and includes an image forming section, a communication section, and a controller. The image forming section performs a printing operation of forming an image on a sheet. The communication section performs communication so as to acquire settlement information including information that identifies the customer. The controller controls the image forming section and the communication section. As to the printing operation performed after acquisition of the settlement information, the controller settles a printing fee with a discount in a unit price per sheet in a situation where a printed sheet count is a predetermined number or more.

DETAILED DESCRIPTION

The following describes an embodiment of the present disclosure with reference to drawings. Elements which are the same or equivalent are labeled with the same reference signs in the drawings and description thereof is not repeated.

Figure 1:
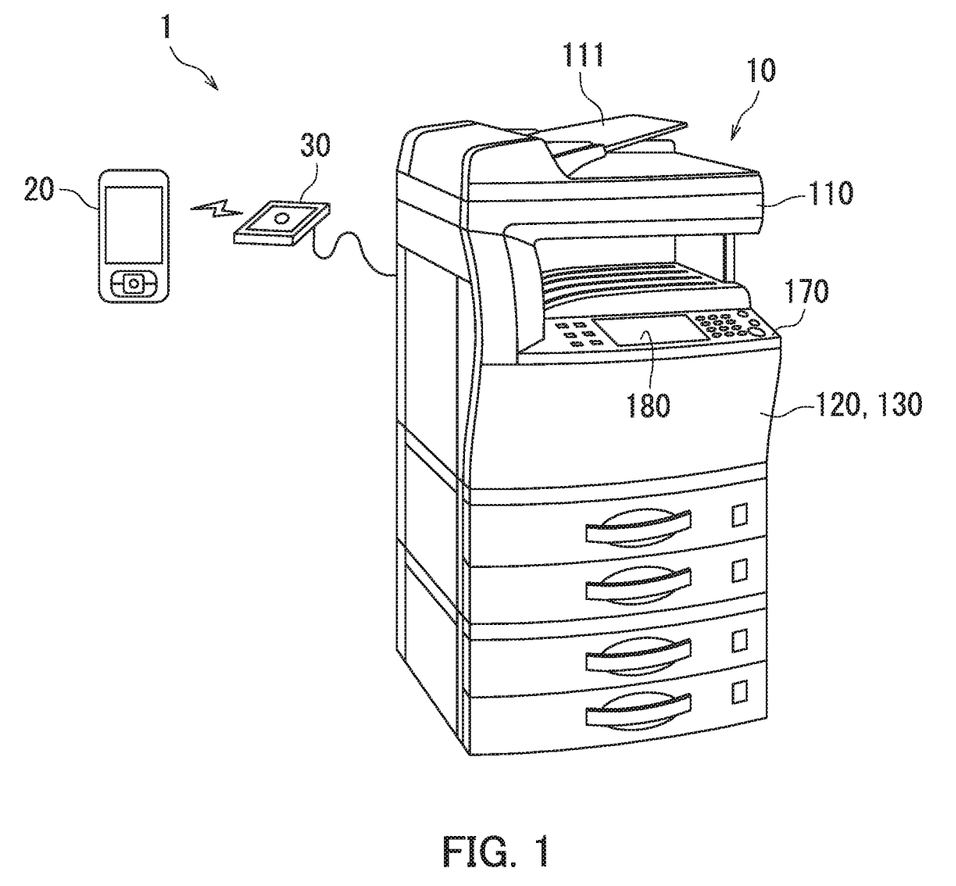
FIG. 1 is a perspective view illustrating an example of a configuration of an image forming system according to an embodiment.

First, an image forming system 1 according to the embodiment will be described with reference to FIG. 1. FIG. 1 is a perspective view illustrating an example of a configuration of the image forming system 1.

As illustrated in FIG. 1, the image forming system 1 includes an image forming apparatus 10 and a smartphone 20. The image forming apparatus 10 includes a near field communication (NFC) reader writer 30 for NFC.

The image forming apparatus 10 is for example a multi-function peripheral (MFP). The multi-function peripheral has at least two functions of a copier, a printer, and a facsimile. The image forming apparatus 10 is installed in an environment used by an indeterminate number of people, such as a convenience store.

The smartphone 20 is a mobile terminal owned by a customer who intends to use the image forming apparatus 10.

The NFC reader writer 30 enables bidirectional NFC communication between the image forming apparatus 10 and the smartphone 20. The NFC reader writer 30 may be separate from the main body of the image forming apparatus 10 or inside the main body of the image forming apparatus 10.

Figure 2:
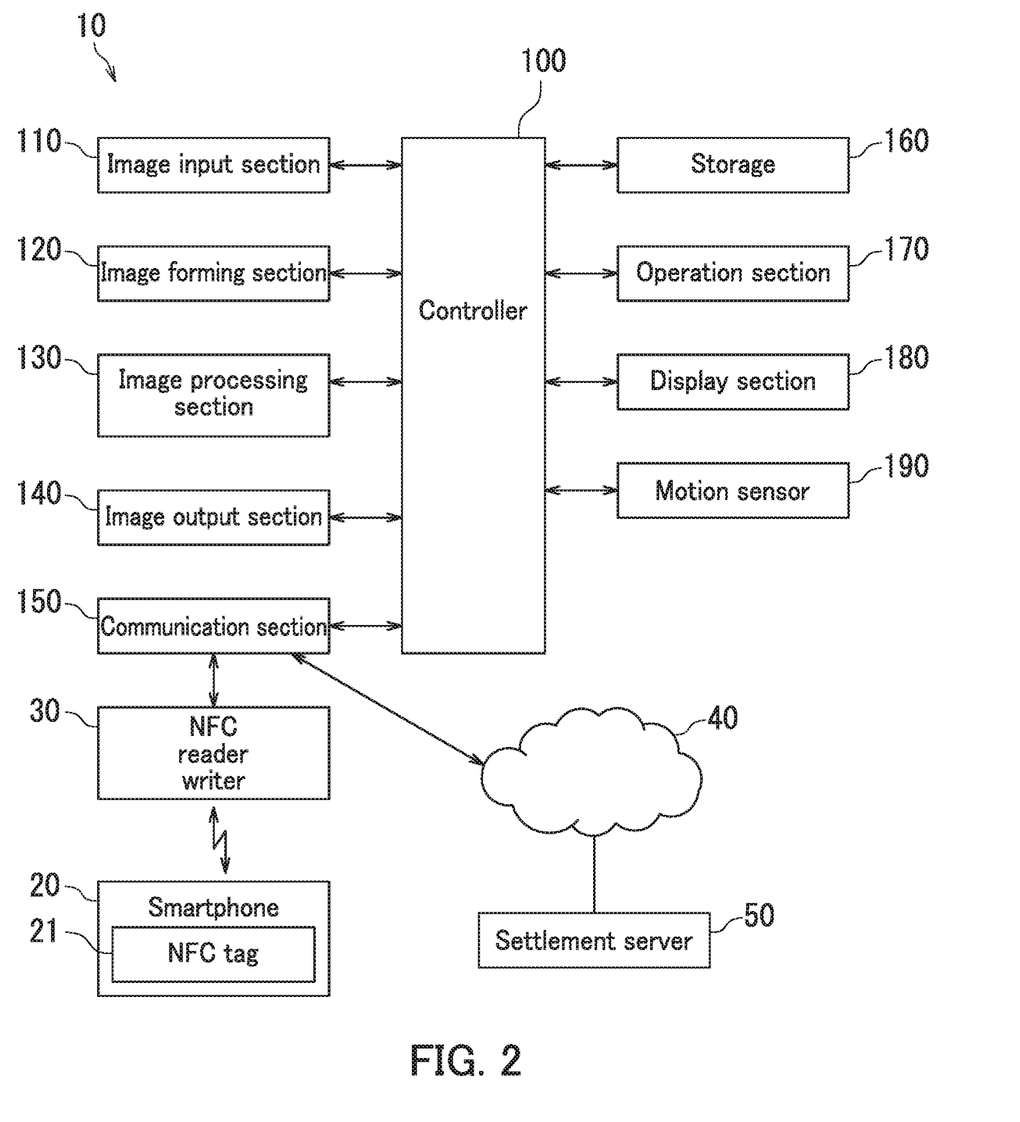
FIG. 2 is a block diagram illustrating an example of a configuration of an image forming apparatus.

Next, the image forming apparatus 10 will be described with reference to FIGS. 1 and 2. FIG. 2 is a block diagram illustrating an example of a configuration of the image forming apparatus 10.

As illustrated in FIG. 2, the image forming apparatus 10 further includes a controller 100, an image input section 110, an image forming section 120, an image processing section 130, an image output section 140, a communication section 150, a storage 160, an operation section 170, a display section 180, and a motion sensor 190.

The controller 100 includes a processor such as a central processing unit (CPU). The storage 160 includes a main storage device such as semiconductor memory and an auxiliary storage device such as a hard disk drive, and stores data and a computer program therein. The processor of the controller 100 controls each section of the image forming apparatus 10 by executing the computer program stored in the storage 160. Specifically, the controller 100 controls the image input section 110, the image forming section 120, the image processing section 130, the image output section 140, the communication section 150, the operation section 170, the display section 180, and the motion sensor 190.

The image input section 110 reads an image of an original document to generate image data. The image input section 110 includes an automated document conveyor device 111 (see FIG. 1) and a device such as a charge-coupled device (CCD) that converts optical information into an electric signal.

The image forming section 120 performs a printing operation of forming an image on a sheet as a recording medium. The image forming section 120 includes a photosensitive drum, a charger, a developing device, a transfer device, a fixing device, and a static eliminator to electrographically form an image on a sheet.

The image processing section 130 performs image processing on the image data read by the image input section 110 or image data received from the smartphone 20.

The image output section 140 outputs the image data processed by the image processing section 130 from the image forming apparatus 10. The image output section 140 is capable of outputting the image data to an external storage medium and also is capable of wirelessly outputting the image data to another external device via the communication section 150.

The communication section 150 is an interface for the image forming apparatus 10 to communicate with another device. The communication section 150 communicates with the smartphone 20 via the NFC reader writer 30. The smartphone 20 has an NFC tag 21. The NFC tag 21 stores settlement information including information that identifies the customer owning the smartphone 20. The settlement information includes identity (ID) information and a mail address of the customer. Further, the communication section 150 communicates with a settlement server 50 via a network 40 such as the Internet. The settlement server 50 performs settlement in a post-payment system based on a customer's electronic money. The communication section 150 further has a function of sending an email to the smartphone 20 via a mail server (not illustrated).

The operation section 170 has a plurality of buttons including an end print button (not shown). The customer selects a function from functions of the multi-function peripheral and configures settings for an image formation process through the operation section 170.

The display section 180 includes for example a liquid crystal display. The display section 180 displays various messages to the customer. The display section 180 may be referred to as "MFP display section" in the drawings so as to be distinguished from the display section of the mobile terminal.

The motion sensor 190 is a sensor that detects presence or absence of a customer in the vicinity of the image forming apparatus 10.

Figure 3:
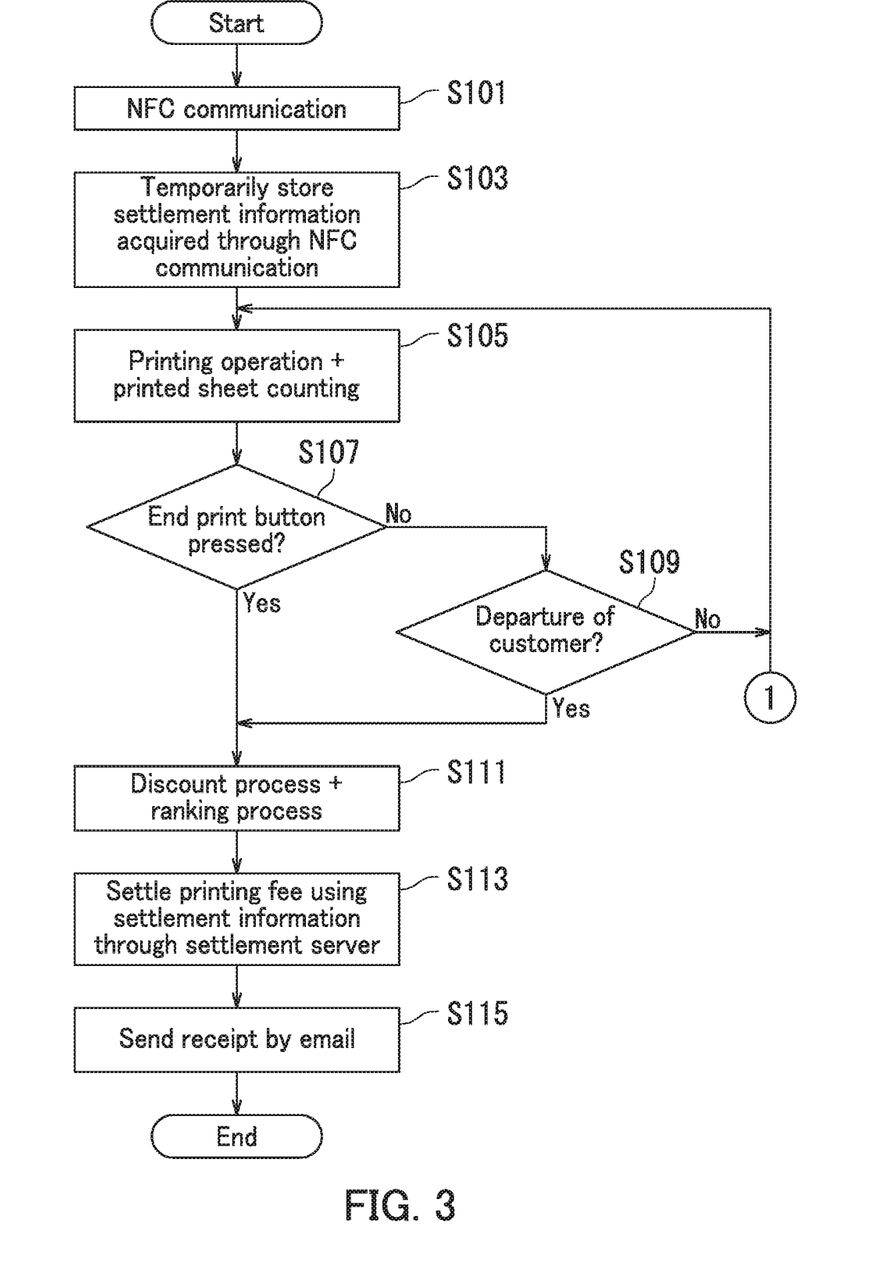
FIG. 3 is a flowchart illustrating an example of processing performed by a controller.

Next, processing performed by the controller 100 will be described with reference to FIGS. 1 to 3. FIG. 3 is a flowchart illustrating an example of processing performed by the controller 100. The following description is based on an assumption that the customer has selected the copy function of the image forming apparatus 10.

Step S101: As illustrated in FIG. 3, the controller 100 controls the communication section 150 to perform NFC communication. A customer who intends to use the image forming apparatus 10 holds his or her smartphone 20 over the NFC reader writer 30. The NFC reader writer 30 reads the payment information recorded on the NFC tag 21 of the smartphone 20. The read settlement information is passed to the controller 100 via the communication section 150. When the process of Step S101 ends, the processing by the controller 100 proceeds to Step S103.

Step S103: the controller 100 temporarily stores the settlement information acquired through the NFC communication in the storage 160. When the process of Step S103 ends, the processing by the controller 100 proceeds to Step S105.

Step S105: According to a customer operation for a copy instruction on the operation section 170, the controller 100 operates the image input section 110 to read a document and controls the image forming section 120 to start a printing operation. The controller 100 counts up a printed sheet count every time the printing operation on a sheet is performed. When the process of Step S105 ends, the processing by the controller 100 proceeds to Step S107.

Step S107: The controller 100 determines whether or not pressing of the end print button of the operation section 170 has been detected. When the controller 100 determines that pressing of the end print button has been detected (Yes in Step S107), the processing by the controller 100 proceeds to Step S111. When the controller 100 determines that pressing of the end print button has not been detected (No in Step S107), the processing by the controller 100 proceeds to Step S109.

Step S109: The controller 100 determines whether or not departure of the customer has been detected based on output of the motion sensor 190. When the controller 100 determines that departure of the customer has been detected (Yes in Step S109), the processing by the controller 100 proceeds to Step S111. When the controller 100 determines that departure of the customer has not been detected (No in Step S109), the processing by the controller 100 returns to Step S105.

Step S111: The controller 100 fixes the printed sheet count, and executes a discount process and a ranking process according to the fixed printed sheet count. Details of the discount process and the ranking process will be described later. When the process of Step S111 ends, the processing by the controller 100 proceeds to Step S113.

Step S113: The controller 100 uses the settlement information temporarily stored in the storage 160 to settle a printing fee through the settlement server 50. When the process of Step S113 ends, the processing by the controller 100 proceeds to Step S115.

Step S115: The controller 100 sends an email containing a receipt to the smartphone 20. When the process of Step S115 ends, the processing by the controller 100 ends.

Through the above processing performed by the controller 100 from Step S101 to Step S115, post-payment of a printing fee based on a customer's electronic money can be achieved. Moreover, in a situation where the customer leaves without pressing the end print button, the processing forcibly proceeds to Step S113 for settlement, preventing occurrence of any unpaid printing fee.

Figure 4:
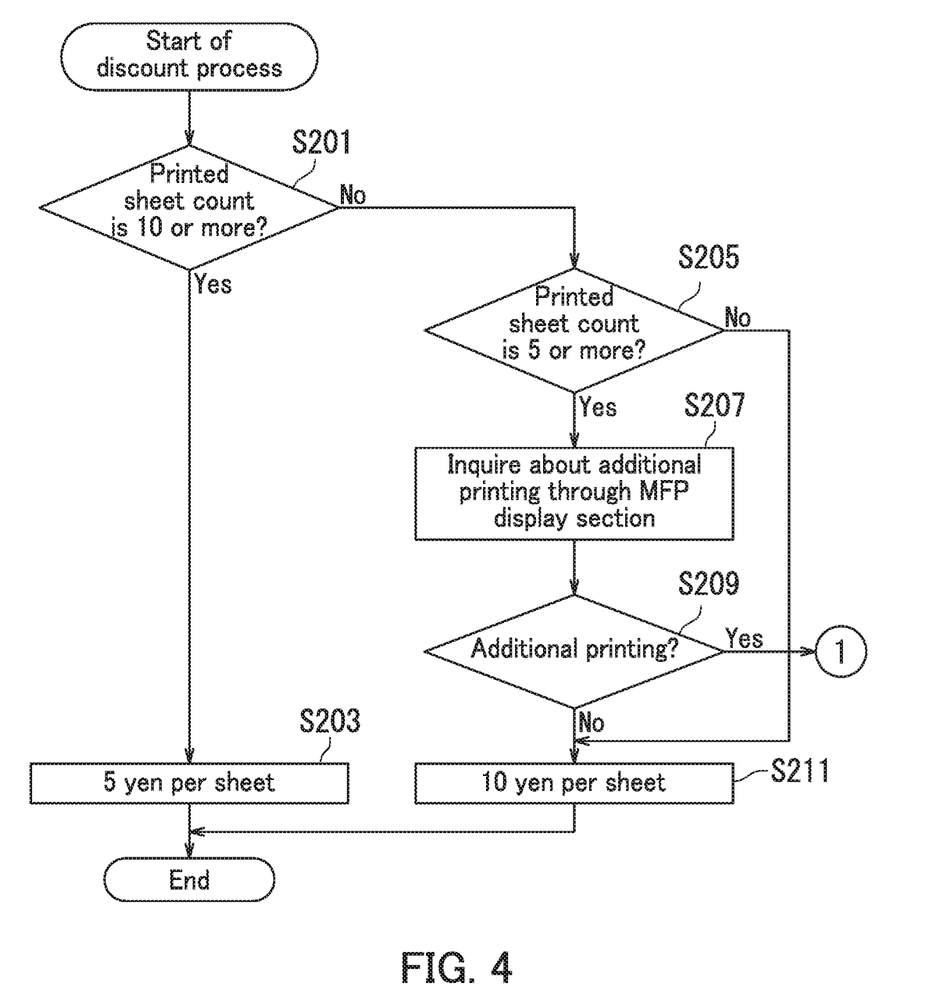
FIG. 4 is a flowchart illustrating an example of a discount process.

Next, the discount process at Step S111 in FIG. 3 will be described with reference to FIGS. 1 to 4. FIG. 4 is a flowchart illustrating an example of the discount process.

Step S201: As illustrated in FIG. 4, the controller 100 determines whether or not the printed sheet count is 10 or more in the printing operation performed after acquisition of the settlement information. When the controller 100 determines that the printed sheet count is 10 or more (Yes in Step S201), the processing by the controller 100 proceeds to Step S203. When the controller 100 determines that the printed sheet count is less than 10 (No in Step S201), the processing by the controller 100 proceeds to Step S205.

Step S203: The controller 100 discounts the standard printing unit price of 10 yen per sheet by setting a printing unit price of 5 yen per sheet. When the process of Step S203 ends, the processing by the controller 100 ends.

Step S205: The controller 100 determines whether or not the printed sheet count is 5 or more in the printing operation performed after acquisition of the settlement information. When the controller 100 determines that the printed sheet count is 5 or more (Yes in Step S205), the processing by the controller 100 proceeds to Step S207. When the controller 100 determines that the printed sheet count is less than 5 (No in Step S205), the processing by the controller 100 proceeds to Step S211.

Step S207: The controller 100 causes the display section 180 to display an inquiry to the customer as to whether or not additional printing is to be performed. For example, a message "Printing fee will be 5 yen per sheet for printing of 10 or more sheets. Is there anything else to print?" is displayed on the display section 180. When the process of Step S207 ends, the processing by the controller 100 proceeds to Step S209.

Step S209: The controller 100 determines whether or not additional printing is to be performed based on the customer's selection operation through the operation section 170. When the controller 100 determines that additional printing is to be performed (Yes in Step S209), the processing by the controller 100 returns to Step S105 in FIG. 3. When the controller 100 determines that additional printing is not to be performed (No in Step S209), the processing by the controller 100 proceeds to Step S211.

Step S211: The controller 100 sets the printing unit price to 10 yen per sheet so as to maintain the standard printing unit price. When the process of Step S211 ends, the processing by the controller 100 ends.

Through the above discount process from Step S201 to Step S211 executed by the controller 100, the printing unit price per sheet is reduced from 10 yen to 5 yen in a situation where the printed sheet count is 10 or more as to the printing operation performed after acquisition of the settlement information. In a situation where the printed sheet count is 5 or more and less than 10, an inquiry is made as to whether or not additional printing is to be performed. However, in a situation where the printed sheet count is less than 5 and far less than the sheet count required for the discount, the inquiry about additional printing is not made.

Figure 5:
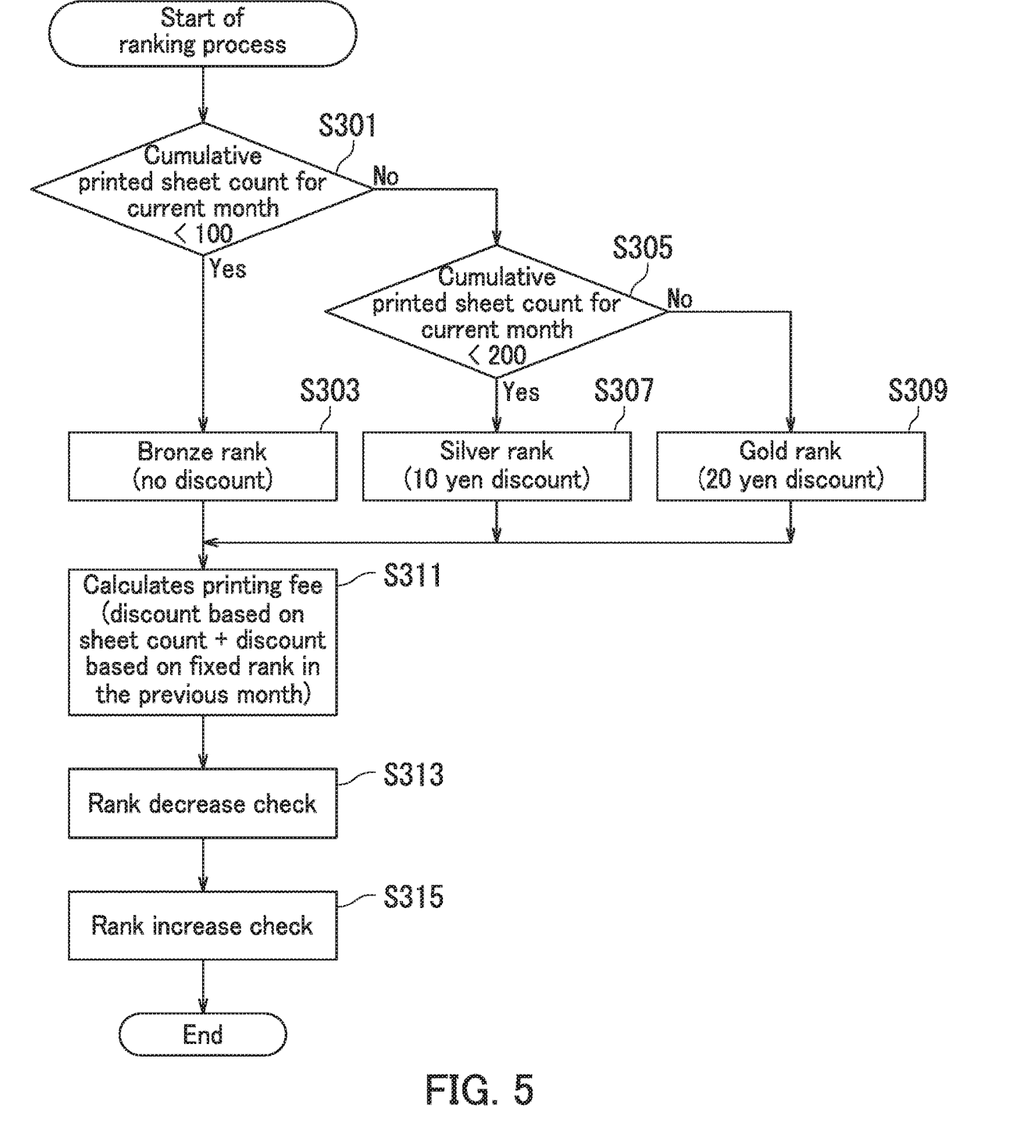
FIG. 5 is a flowchart illustrating an example of a ranking process.

Next, the ranking process at Step S111 in FIG. 3 will be described with reference to FIGS. 1 to 3 and 5. FIG. 5 is a flowchart illustrating an example of the ranking process. The following description is based on an assumption that information indicating a cumulative printed sheet count in the current month and information indicating a fixed rank for the previous month are already recorded for each customer in the storage 160.

Step S301: As illustrated in FIG. 5, the controller 100 determines whether or not a cumulative printed sheet count in the current month for the customer having used the image forming apparatus 10 is less than 100. When the controller 100 determines that the cumulative printed sheet count in the current month is less than 100 (Yes in Step S301), the processing by the controller 100 proceeds to Step S303. When the controller 100 determines that the cumulative printed sheet count in the current month is 100 or more (No in Step S301), the processing by the controller 100 proceeds to Step S305.

Step S303: The controller 100 sets the rank of the customer having used the image forming apparatus 10 in the current month at a bronze rank. In the bronze rank, discount on a printing fee is not performed as preferential processing, for example. When the process of Step S303 ends, the processing by the controller 100 proceeds to Step S311.

Step S305: the controller 100 determines whether or not the cumulative printed sheet count in the current month for the customer having used the image forming apparatus 10 is less than 200. When the controller 100 determines that the cumulative printed sheet count in the current month is less than 200 (Yes in Step S305), the processing by the controller 100 proceeds to Step S307. When the controller 100 determines that the cumulative printed sheet count in the current month is 200 or more (No in Step S305), the processing by the controller 100 proceeds to Step S309.

Step S307: The controller 100 sets the rank of the customer having used the image forming apparatus 10 in the current month at a silver rank. In the silver rank, a 10 yen discount is applied to the printing fee as preferential processing, for example. When the process of Step S307 ends, the processing by the controller 100 proceeds to Step S311.

Step S309: The controller 100 sets the rank of the customer having used the image forming apparatus 10 in the current month at a gold rank. In the gold rank, a 20 yen discount is applied to the printing fee as preferential processing, for example. When the process of Step S309 ends, the processing by the controller 100 proceeds to Step S311.

Step S311: The controller 100 calculates the printing fee. In calculation of the printing fee, a discount based on the printed sheet count and a discount based on the fixed rank in the previous month are applied. According to the discount based on the printed sheet count, different printing unit prices are set depending on whether or not the printed sheet count is 10 or more, as illustrated in FIG. 4. For example, in a situation where the printed sheet count is 10 or more, the printing fee will be an amount obtained by multiplying the discount printing unit price of 5 yen by the printed sheet count. By contrast, in a situation where the printed sheet count is less than 10, the printing fee will be an amount obtained by multiplying the standard printing unit price of 10 yen by the printed sheet count. The controller 100 further applies preferential processing based on the fixed rank in the previous month to the printing fee after the discount based on the printed sheet count is applied. For example, no discount for the bronze rank, a 10 yen discount for the silver rank, or a 20 yen discount for the gold rank is applied. When the process of Step S311 ends, the processing by the controller 100 proceeds to Step S313.

Step S313: The controller 100 executes a rank decrease check. Details of the rank decrease check will be described later. When the process of Step S313 ends, the processing by the controller 100 proceeds to Step S315.

Step S315: The controller 100 executes a rank increase check. Details of the rank increase check will be described later. When the process of Step S315 ends, the processing by the controller 100 ends.

Through the above ranking process from Step S301 to Step S315 executed by the controller 100, the controller 100 sets a rank based on the cumulative printed sheet count for the customer in the current month, and executes preferential processing based on the fixed rank of the customer in the previous month.

Note that the preferential processing based on the rank of the customer in the previous month may be processing by which the printing unit price is more greatly reduced in a higher rank, instead of the discount processing by which a fixed amount of discount specified for each rank is applied.

Figure 6:
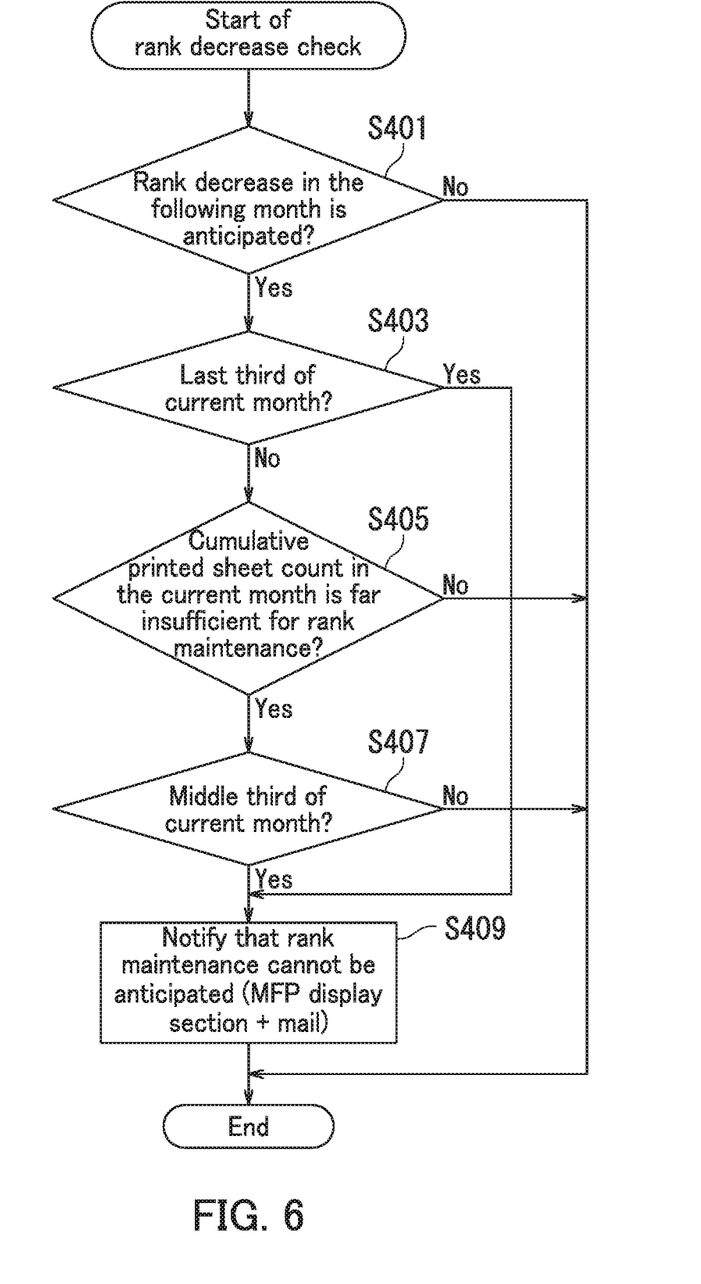
FIG. 6 is a flowchart illustrating an example of a rank decrease check.

Next, the rank decrease check at Step S313 in FIG. 5 will be described with reference to FIGS. 1, 2, 5, and 6. FIG. 6 is a flowchart illustrating an example of the rank decrease check.

Step S401: As illustrated in FIG. 6, the controller 100 determines whether or not a decrease of the customer having used the image forming apparatus 10 is anticipated in the following month. When the controller 100 determines that a rank decrease is anticipated in the following month (Yes in Step S401), the processing by the controller 100 proceeds to Step S403. When the controller 100 determines that a rank decrease is not anticipated in the following month (No in Step S401), the processing by the controller 100 ends.

Step S403: The controller 100 determines whether or not the current date is in the last third of the current month. When the controller 100 determines that the current date is in the last third of the current month (Yes in Step S403), the processing by the controller 100 proceeds to Step S409. When the controller 100 determines that the current date is not in the last third of the current month (No in Step S403), the processing by the controller 100 proceeds to Step S405.

Step S405: the controller 100 determines whether or not the cumulative printed sheet count for the customer having used the image forming apparatus 10 in the current month is far insufficient for rank maintenance. When the controller 100 determines that the cumulative printed sheet count in the current month is far insufficient for rank maintenance (Yes in Step S405), the processing by the controller 100 proceeds to Step S407. When the controller 100 determines that the cumulative printed sheet count in the current month is not far insufficient for rank maintenance (No in Step S405), the processing by the controller 100 ends.

Step S407: The controller 100 determines whether or not the current date is in the middle third of the current month. When the controller 100 determines that the current date is in the middle third of the current month (Yes in Step S407), the processing by the controller 100 proceeds to Step S409. When the controller 100 determines that the current date is not in the middle third of the current month (No in Step S407), the processing by the controller 100 ends.

Step S409: The controller 100 notifies the customer of a message that rank maintenance cannot be anticipated. The message that rank maintenance cannot be anticipated is displayed on the display section 180 for immediate attention by the customer. In addition, the controller 100 sends an email containing a message that rank maintenance cannot be anticipated to the smartphone 20. When the process of Step S409 ends, the processing by the controller 100 ends.

Through the above rank decrease check from Step S401 to Step S409 executed by the controller 100, the controller 100 notifies the customer that rank maintenance cannot be anticipated in a situation where a rank decrease of the customer is anticipated in the following month. Moreover, the controller 100 changes the timing of notification to the customer according to the sheet count additionally required for rank maintenance.

Figure 7:
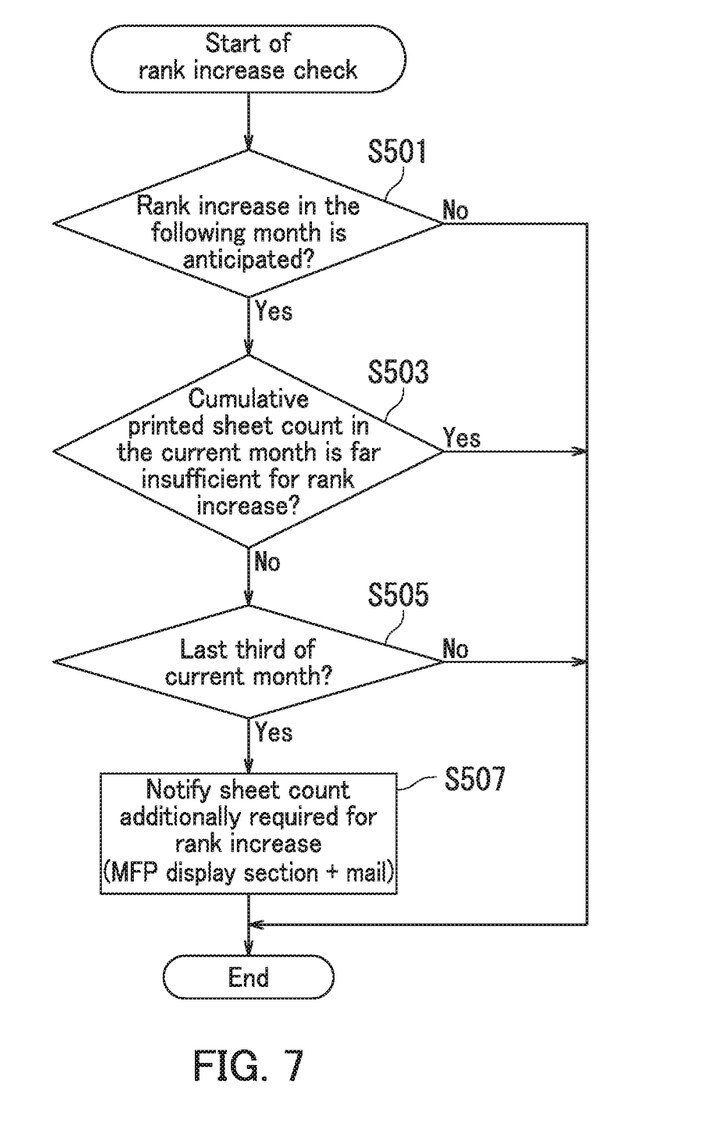
FIG. 7 is a flowchart illustrating an example of a rank increase check.

Next, the rank increase check at Step S315 in FIG. 5 will be described with reference to FIGS. 1, 2, 5, and 7. FIG. 7 is a flowchart illustrating an example of the rank increase check.

Step S501: As illustrated in FIG. 7, the controller 100 determines whether or not a rank increase of the customer having used the image forming apparatus 10 is anticipated in the following month. When the controller 100 determines that a rank increase is anticipated in the following month (Yes in Step S501), the processing by the controller 100 proceeds to Step S503. When the controller 100 determines that a rank increase is not anticipated in the following month (No in Step S501), the processing by the controller 100 ends.

Step S503: the controller 100 determines whether or not the cumulative printed sheet count for the customer having used the image forming apparatus 10 in the current month is far insufficient for rank increase. When the controller 100 determines that the cumulative printed sheet count in the current month is far insufficient for rank increase (Yes in Step S503), the processing by the controller 100 ends. When the controller 100 determines that the cumulative printed sheet count in the current month is not far insufficient for rank increase (No in Step S503), the processing by the controller 100 proceeds to Step S505.

Step S505: The controller 100 determines whether or not the current date is in the last third of the current month. When the controller 100 determines that the current date is in the last third of the current month (Yes in Step S505), the processing by the controller 100 proceeds to Step S507. When the controller 100 determines that the current date is not in the last third of the current month (No in Step S505), the processing by the controller 100 ends.

Step S507: The controller 100 notifies the customer of a sheet count additionally required for rank increase. The sheet count additionally required for rank increase is displayed on the display section 180 for immediate attention by the customer. In addition, the controller 100 sends an email containing a sheet count additionally required for rank increase to the smartphone 20. When the process of Step S507 ends, the processing by the controller 100 ends.

Through the above rank increase check from Step S501 to Step S507 executed by the controller 100, the controller 100 notifies the customer of a sheet count additionally required for rank increase in a situation where a rank increase of the customer is anticipated in the following month. The controller 100 may change the timing of notification to the customer according to the sheet count additionally required for rank increase.

According to the embodiment, the image forming apparatus 10 that is suitably used in the post-payment system can be provided.

Depending on the frequency of use by the customer, such as daily printing or concentrated printing at the end of each month, the timing of notification that rank maintenance cannot be anticipated or the timing of notification of the sheet count additionally required for rank increase may be changed.

The customer may touch the NFC reader writer 30 with an integrated circuit (IC) card having an NFC tag 21 therein instead of the smartphone 20.

The NFC reader writer 30 can be replaced with a QR CODE (registered Japanese trademark) reader that reads a QR code. The customer causes the QR code reader to read a QR code displayed on a screen of the smartphone 20. The QR code contains payment information of the customer. A one-dimensional barcode may be used instead of the QR code.

The image forming apparatus 10 may enable a pre-payment system based on a customer's electronic money in addition to the post-payment system. The image forming apparatus 10 may further include a coin vendor for handling cash.

In a situation where prepaid electronic money is used and the prepaid balance is less than printing fee for one sheet, a message asking whether or not to load money is displayed on the display section 180. When the customer chooses not to load money, the image forming apparatus 10 terminates the operation because further printing is impossible. When the customer chooses to load money, the image forming apparatus 10 performs loading by cash or pre-registered credit card. As a result, the image forming apparatus 10 enters a printable state and printing can be performed up to a maximum sheet count allowed by the prepaid balance. When the prepaid balance is 100 yen or less, a message is displayed on the display section 180 urging the customer to choose "print in 2in1 or 4in1 from the next printing to save money", "load money", or "continue printing operation as is". The image forming apparatus 10 executes the mode ("2in1", "4in1", "load", or "continue as is") chosen by the customer.

Hereinbefore, an embodiment of the present disclosure has been described with reference to the drawings. However, the present disclosure is not limited to the above embodiment and may be implemented in various different forms that do not deviate from the essence of the present disclosure. The drawings schematically illustrate elements of configuration in order to facilitate understanding, and properties such as thickness, length, and number of elements of configuration illustrated in the drawings may differ from actual properties thereof in order to facilitate preparation of the drawings. Aspects of the elements of configuration described in the above embodiment such as shape and dimension are merely examples and not particular limitations. The elements of configuration may be variously altered within a scope not substantially departing from the effects of the present disclosure.

For example, the image forming apparatus 10 is an electrophotographic image forming apparatus in the embodiment, but the present disclosure is not limited thereto. The image forming apparatus 10 may be an inkjet image forming apparatus.

What is claimed is:

1. An image forming apparatus used in a post-payment system based on a customer's electronic money, the image forming apparatus comprising:
    an image forming section configured to perform a printing operation of forming an image on a sheet;
    a communication section configured to perform communication so as to acquire settlement information including information that identifies the customer; and
    a controller configured to control the image forming section and the communication section, wherein
    the controller settles a printing fee with a discount in a unit price per sheet in a situation where a printed sheet count is a predetermined number or more in the printing operation performed after acquisition of the settlement information,
    the controller sets a rank based on a cumulative printed sheet count for the customer in a current month, and executes preferential processing based on a fixed rank of the customer in a previous month to settle the printing fee, and
    in a situation where a rank decrease of the customer is anticipated in a following month, the controller notifies the customer that rank maintenance cannot be anticipated.

2. The image forming apparatus according to claim 1, wherein
    the controller causes the image forming section to start the printing operation after temporarily storing the settlement information.

3. The image forming apparatus according to claim 1, further comprising:
    an operation section including an end print button; and
    a sensor configured to detect presence or absence of a detection target, wherein
    the controller starts the settlement after detecting pressing of the end print button or detecting departure of the customer based on output of the sensor.

4. The image forming apparatus according to claim 1, further comprising:
    a display section configured to display a message, wherein
    in a situation where the printed sheet count is less than the predetermined number, the controller causes the display section to display an inquiry as to whether or not additional printing is to be performed before the settlement.

5. The image forming apparatus according to claim 1, wherein
    the controller changes the timing of notification to the customer according to a sheet count additionally required for the rank maintenance.

6. An image forming apparatus used in a post-payment system based on a customer's electronic money, the image forming apparatus comprising:
    an image forming section configured to perform a printing operation of forming an image on a sheet;
    a communication section configured to perform communication so as to acquire settlement information including information that identifies the customer; and
    a controller configured to control the image forming section and the communication section, wherein
    the controller settles a printing fee with a discount in a unit price per sheet in a situation where a printed sheet count is a predetermined number or more in the printing operation performed after acquisition of the settlement information,
    the controller sets a rank based on a cumulative printed sheet count for the customer in a current month, and executes preferential processing based on a fixed rank of the customer in a previous month to settle the printing fee, and
    in a situation where a rank increase of the customer is anticipated in the following month, the controller notifies the customer of a sheet count additionally required for the rank increase.

7. The image forming apparatus according to claim 6, wherein
    the controller changes the timing of notification to the customer according to the sheet count additionally required for the rank increase.

8. The image forming apparatus according to claim 6, wherein
    the controller causes the image forming section to start the printing operation after temporarily storing the settlement information.

9. The image forming apparatus according to claim 6, further comprising:
    an operation section including an end print button; and
    a sensor configured to detect presence or absence of a detection target, wherein
    the controller starts the settlement after detecting pressing of the end print button or detecting departure of the customer based on output of the sensor.

10. The image forming apparatus according to claim 6, further comprising:
    a display section configured to display a message, wherein
    in a situation where the printed sheet count is less than the predetermined number, the controller causes the display section to display an inquiry as to whether or not additional printing is to be performed before the settlement.

* * * * *